United States Patent [19]

Cooper

[11] 4,410,428
[45] Oct. 18, 1983

[54] DUPLEX CAM-OPERATED PRESSURE-BALANCED SLEEVE VALVE

[75] Inventor: Roydon B. Cooper, Locust Valley, N.Y.

[73] Assignee: Pall Corporation, Glen Cove, N.Y.

[21] Appl. No.: 403,182

[22] Filed: Jul. 29, 1982

[51] Int. Cl.³ .......................................... B01D 29/36
[52] U.S. Cl. .................................. 210/340; 137/601; 137/625.29; 137/867; 210/424
[58] Field of Search .............. 137/601, 625.29, 625.48, 137/636.1, 867; 210/340, 341, 418, 420, 424, 435, 497.01

[56] References Cited

U.S. PATENT DOCUMENTS

| | | | |
|---|---|---|---|
| 1,288,257 | 12/1918 | Stewart | 210/341 |
| 1,625,024 | 4/1927 | Hall | 210/341 |
| 3,394,735 | 7/1968 | Wurster | 210/341 |
| 3,914,176 | 10/1975 | Holmes | 210/340 |
| 3,915,866 | 10/1975 | Brown et al. | 210/424 |
| 4,046,695 | 9/1977 | Tucker | 210/340 |
| 4,274,445 | 6/1981 | Cooper | 210/340 |

*Primary Examiner*—Ivars C. Cintins

[57] ABSTRACT

A duplex cam-operated pressure-balanced sleeve valve is provided for controlling fluid flow into either one or both of two fluid lines, such as to either one or both of two filter elements, comprising, in combination;

(1) a valve housing;
(2) first and second valve chambers in the housing in alignment with a cam chamber therebetween;
(3) first, second, and third fluid flow ports in the housing communicating with the first valve chamber, and fourth, fifth, and sixth fluid flow ports in the housing communicating with the second valve chamber;
(4) a first reciprocable sleeve valve member in the first valve chamber, axially movable within the first valve chamber between positions controlling flow from the first fluid port to one or both of the second and third fluid flow ports;
(5) a second reciprocable sleeve valve member, preferably coaxial with the first sleeve valve member, in the second valve chamber axially movable within the second valve chamber with the first sleeve valve member between positions controlling flow from one or both of the fourth and fifth fluid flow ports to the sixth fluid flow port;
(6) cam-following valve-actuating means in the cam chamber operatively connected to both the first and second sleeve valve members, for reciprocably moving both valve members together between their flow-controlling positions;
(7) a cam in the cam chamber movable between at least three selected positions and operatively connected with the cam-following valve-actuating means in a manner such that:
  (a) with the cam in a first position, the first sleeve valve member is in a position communicating one of the second and third fluid flow ports with the first fluid flow port and the second sleeve valve member is in a position communicating one of the fourth and fifth fluid flow ports with the sixth fluid flow port;
  (b) with the cam in a second position, the first sleeve valve member is in a position communicating the other of the second and third fluid flow ports with the first fluid flow port and the second sleeve valve member is in a position communicating the other of the fourth and fifth fluid flow ports with the sixth fluid flow port;
  (c) with the cam in a third position, both the first and second sleeve valve members are in positions communicating the first with the second and third fluid flow ports and the fourth with the fifth and sixth fluid flow ports;
(8) means for moving the cam between each of the selected positions, thereby shifting the valves in unison;
(9) the first and second sleeve valve members each having an interior pressure-receiving surface exposed at all times to fluid pressure in the first and second valve chambers, respectively, and in the first and sixth fluid flow ports, respectively, and an exterior pressure-receiving surface exposed to fluid pressure in the second and third, and fourth and fifth fluid flow ports, respectively, fluid flow through which is controlled by the respective sleeve valves, so that there is a zero component of force arising from any pressure differential across the valves tending either to move the sleeve valve members or to resist cam-operated movement of the sleeve valve members between their selected positions;

(10) the cam-following valve actuating means having opposed pressure-receiving surfaces, of which one is exposed to fluid pressure in the first valve chamber, and the other is exposed to fluid pressure in the second valve chamber;

(11) the opposed pressure-receiving surfaces of the cam-following valve-actuating means being of such small relative surface areas that any fluid pressure differential between first and second valve chambers on the opposed pressure-receiving surfaces thereof offers negligible resistance to cam-operated reciprocation of the sleeve valve members, so that such fluid pressure differential does not interfere with movement of the first and second sleeve valve members between their selected positions.

11 Claims, 12 Drawing Figures

DUPLEX CAM-OPERATED PRESSURE-BALANCED SLEEVE VALVE

It is frequently necessary in fluid systems to provide a valve which is capable of controlling flow between either or both of two fluid lines, and provide continuous on-stream flow capability, for example, through a duplex filter system where one filter can always be on-stream while the other is out for service.

Fluid systems requiring a filtered fluid flow frequently have duplicate or reserve filters available, to be put onstream immediately that a filter becomes partially or fully blocked, so as to permit filtered flow to continue while the loaded filter is being serviced or replaced. Reserve filter systems are shown for example in U.S. Pat. No. 3,283,902 to J. A. Farris, et al, patented Nov. 8, 1966; U.S. Pat. No. 3,262,563 to D. B. Pall, patented July 26, 1966; U.S. Pat. No. 3,262,564 to D. B. Pall et al, patented July 26, 1966; U.S. Pat. No. 3,262,565 to B. F. Silverwater, patented July 26, 1966.

A further example is a twin-bed desiccant dryer system, in which gaseous influent can always be directed into one bed for adsorption while the other bed is being regenerated, permitting switching the flow to the other bed which has in the meantime been regenerated when the onstream bed becomes exhausted.

However, the three-way valves provided for use in such systems are not fully satisfactory, particularly when the systems operate under high internal fluid pressure, so that the valve must be switched under conditions where one side of the valve is under high pressure, while the other side of the valve is under relatively low pressure.

Kirkman U.S. Pat. No. 3,783,898, patented Jan. 8, 1974, provides a fluid flow control device having first and second valve means biased normally towards closed positions, and control means for opening the valve means. The control means is operable when the device is connected in a fluid flow path either to displace the first valve means against its bias into an open position, or to displace the second valve means against its bias into an open position. Opening the first valve means permits fluid to flow through the device from an inlet side to an outlet side, while opening of the second flow means permits the venting of the outlet side of the device. The second valve means is also openable independently of the control means, under the action of excess pressure on the outlet side of the device, to relieve the excess pressure.

The two valves provided are of the piston and poppet type, reciprocably connected to a push rod 19, with two spacing collars 22, 23 and a cam 24 located between the collars. The cam 24 is eccentrically mounted on shaft 25, rotated by the handle 26. Movement of the handle 26 to one side or the other of the neutral position causes the shaft 25 to rotate in one or the other direction, so that the cam 24 displaces the push rod 19 to open and close each of the valve means 2 and 3, one valve being closed when the other is open, or both valves being closed, according to the position of the cam. The valve is not designed to operate under high fluid pressure differentials. The intention is for it to function as a control valve for use in inflating and deflating inflatable bags, used for lifting applications, such as for lifting crashed vehicles for rescue purposes.

The shape of the cam 24 is not clearly shown in the drawings. It is described as an eccentric end portion of the shaft 25, which is rotatably mounted in the housing to extend perpendicular to the push rod 19.

Meynell U.S. Pat. No. 3,403,700, patented Oct. 1, 1968, and Sanford U.S. Pat. No. 3,468,344, patented Sept. 23, 1969, show fluid flow control valves with cam actuators, but the cams do not operate a reciprocating linkage between two valves.

Copper U.S. Pat. No. 4,274,445, patented June 23, 1981, provides a pressure-balanced three-way transfer valve for controlling fluid flow into one of two fluid lines, comprising, in combination (1) a housing;
(2) a valve chamber in the housing;
(3) first, second and third fluid flow ports in the housing;
(4) first, second and third fluid passages in the housing, intercommunicating the valve chamber with the first, second and third fluid flow ports;
(5) a first valve member in the valve chamber movable between open and closed positions across the first fluid flow passage, and controlling flow through the first fluid flow port;
(6) a second valve member in the valve chamber movable between open and closed positions across the second fluid flow passage, and controlling flow through the second fluid flow port;
(7) first cam-following valve-actuating means in the valve chamber operatively connected to the first valve member;
(8) second cam-following valve actuating means in the valve chamber operatively connected to the second valve member;
(9) a cam in the housing separated from the valve chamber and exposed to a pressure lower than fluid pressure, such as atmospheric pressure; movable between first and second positions and operatively connected with the first and second cam-following valve-actuating means in a manner such that
 (a) with the cam in the first position, the first valve member is open and the second valve member is closed;
 (b) with the cam in the second position, the second valve member is open and the first valve member is closed; and
 (c) with the cam in intermediate positions, both the first and second valve members are open at least partially;
(10) means for moving the cam between the first and second positions, thereby opening and closing the valves;
(11) a first pressure-equalizing chamber defined by the first cam-following valve-actuating means and the first valve chamber;
(12) a second pressure-equalizing chamber defined by the second cam-following valve-actuating means and the second valve member;
(13) a first fluid passage through the first cam-following valve-actuating means intercommunicating the pressure lower than fluid pressure with the first pressure-equalizing chamber;
(14) a second fluid passage through the second cam-following valve-actuating means interconnecting the pressure lower than fluid pressure with the second pressure-equalizing chamber;
(15) the first and second valve members each having pressure-receiving surfaces exposed to fluid pressure in the valve chamber and opposed pressure-receiving surfaces exposed to pressure lower than fluid pressure in the pressure-equalizing chamber;
(16) the first and second cam-following valve actuating means each having pressure-receiving surfaces exposed to fluid pressure in the valve chamber and opposed pressure-receiving surfaces exposed to pressure lower than fluid pressure; and
(17) the opposed pressure-receiving surfaces of the first and second valve members and first and second cam-following valve-actuating means being of such surface areas that the fluid pressure and lower pressure acting on the opposed pressure-receiving surfaces of the cam-following valve actuating means and the valve means are substantially balanced;

whereby such fluid pressures do not interfere with movement of the first and second valve members.

The first and second valve members and the first and second cam-following valve-actuating means are substantially balanced with respect to the opposed fluid pressures acting upon the pressure-receiving surfaces thereof, whether the valve members are in the open or closed positions. When the valve members are in the closed positions, there are no pressure-receiving surfaces exposed to upstream and downstream fluid pressure giving rise to a force component tending to move the valve members away from the closed position, and the opposed pressure-receiving surfaces of the cam-following valve-actuating means are in balance so that these also have no pressure/force component tending to move them in a valve-opening direction. The same situation prevails when the valve members are in the partially to fully open position. The valve members now have pressure-receiving surfaces exposed to fluid pressure in the valve chamber, but all pressure-receiving surfaces thereof are now exposed to the same fluid pressure in the valve chamber, and are substantially in balance while the valve is in the open position, and again the opposed pressure-receiving surfaces of the cam-following valve-actuating means are in balance with respect to the opposed fluid pressures acting upon them.

This valve is complicated and expensive to manufacture, and is not suited for uses where full pressure balancing is not required, such as where internal fluid pressures or fluid pressure differentials are not extraordinarily high. For many uses, when cam operation is provided, a pressure imbalance that does not greatly increase the effort to move the valve between open and closed positions can be tolerated.

In accordance with the present invention, a duplex sleeve valve is provided with tubular valve members, so arranged that the valves are slidable between selected positions, with the result that whether the valve members are in sealing contact with a valve seat or have moved away from a valve seat, their pressure-receiving surfaces exposed to fluid pressure upstream and downstream of the valve give rise to no component of force tending to move the valve members in either direction, or to resist such movements of the valve, so that any fluid pressure differential across the valve does not interfere with movement of the valve members onward to their next selected position.

The duplex sleeve valve of the invention comprises, in combination;
(1) a valve housing;
(2) first and second valve chambers in the housing in alignment with a cam chamber therebetween;
(3) first, second, and third fluid flow ports in the housing communicating with the first valve chamber, and fourth, fifth, and sixth fluid flow ports in the housing communicating with the second valve chamber;
(4) a first reciprocable sleeve valve member in the first valve chamber, axially movable within the first valve chamber between positions controlling flow from the first fluid port to one or both of the second and third fluid flow ports;
(5) a second reciprocable sleeve valve member, preferably coaxial with the first sleeve valve member, in the second valve chamber axially movable within the second valve chamber with the first sleeve valve member between positions controlling flow from one or both of the fourth and fifth fluid flow ports to the sixth fluid flow port;
(6) cam-following valve-actuating means in the cam chamber operatively connected to both the first and second sleeve valve members, for reciprocably moving both valve members together between their flow-controlling positions;
(7) a cam in the cam chamber movable between at least three selected positions and operatively connected with the cam-following valve-actuating means in a manner such that:
  (a) with the cam in a first position, the first sleeve valve member is in a position communicating one of the second and third fluid flow ports with the first fluid flow port and the second sleeve valve member is in a position communicating one of the fourth and fifth fluid flow ports with the sixth fluid flow port;
  (b) with the cam in a second position, the first sleeve valve member is in a position communicating the other of the second and third fluid flow ports with the first fluid flow port and the second sleeve valve member is in a position communicating the other of the fourth and fifth fluid flow ports with the sixth fluid flow port;
  (c) with the cam in a third position, both the first and second sleeve valve members are in positions communicating the first with the second and third fluid flow ports and the fourth with the fifth and sixth fluid flow ports;
(8) means for moving the cam between each of the selected positions, thereby shifting the valves in unison;
(9) the first and second sleeve valve members each having an interior pressure-receiving surface exposed at all times to fluid pressure in the first and second valve chambers, respectively, and in the first and sixth fluid flow ports, respectively, and an exterior pressure-receiving surface exposed to fluid pressure in the second and third, and fourth and fifth fluid flow ports, respectively, fluid flow through which is controlled by the respective sleeve valves, so that there is a zero component of force arising from any pressure differential across the valves tending either to move the sleeve valve members or to resist cam-operated movement of the sleeve valve members between their selected positions;
(10) the cam-following valve actuating means having opposed pressure-receiving surfaces, of which one is exposed to fluid pressure in the first valve chamber, and the other is exposed to fluid pressure in the second valve chamber;

(11) the opposed pressure-receiving surfaces of the cam-following valve-actuating means being of such small relative surface areas that any fluid pressure differential between first and second valve chambers on the opposed pressure-receiving surfaces thereof offers negligible resistance to cam-operated reciprocation of the sleeve valve members, so that such fluid pressure differential does not interfere with movement of the first and second sleeve valve members between their selected positions.

The tubular duplex sleeve valve construction, cam-operated and pressure-balanced, has many advantages. Because of the tubular sleeve valve construction, the valve is energy efficient, and provides a high through flow with a low pressure drop. Inasmuch as it is possible to size the open internal diameter of the sleeve valves available to flow and the fluid ports and any fluid passages in the valve housing to accept the maximum flow required in the system, no substantial flow restriction is provided by the valve itself; any flow restriction arises only from functional components serviced by the valve, such as filter assemblies, sorbent or desiccant beds, etc.

Because the sleeve valves are interconnected and positively operated in either direction by a single cam, they move together in unison. Moreover, their position is fixed by the cam at the same time, so that the valves can simultaneously be put in any selected position, and will remain in that position until the cam is manipulated to the next selected position. The valves can accordingly be moved together between positions in which one valve is open and the other closed; one valve closed and the other open; and both valves partially open, with positive flow control in each position.

Inasmuch as it is the peripheral external surface of the valves that controls flow through the second, third, fourth and fifth fluid flow ports in the housing, and the valves are sealed against valve seats along their external periphery, this provides pressure-balancing for minimum operating force. The valve can be moved between open and closed and any intermediate positions by operation of the cam with a minimum of effort. The cam operation provides smooth low-torque valve transfer between the selected positions, and provides positive detenting to prevent accidental shifting of the valves from any selected position.

The cam can be arranged to be operated manually or mechanically or electrically, using rotary solenoids, stepping motors, or air and hydraulic cylinders, in which event the operators can be remote from the actual position of the valve.

The sleeve valves can in addition be provided with smooth reciprocable sleeve seal guards, which move with the valves and prevent seal dislodgement by flow forces. This is an optional feature, but it is illustrated in the embodiments of the valve shown in the drawing.

A further feature is the provision of a commuter valve through the valve housing, which provides for refilling and repressurizing of a serviced functional cavity such as a filter assembly or a desiccant bed chamber after change-over of the valve from one side of the system to the other. The commuter valve can be arranged to supply filtered fluid or dried effluent gas to the downstream side of a newly installed filter element or newly regenerated desiccant bed, preventing it from contamination with influent gas or liquid, and at the same time moving air ahead of the components and venting this on out of the housing ahead of the stream flowing into the functions, such as the filter assembly or desiccant bed, that is to be put onstream as or when needed.

Valves in accordance with the invention give good performance at high fluid pressures, up to about 5000 psi, and at fluid pressure differentials across the sleeve valves up to about 1500 psi.

In the preferred embodiment, the sleeve valve members are each cylindrical, and arranged for axial reciprocation between limiting positions, along a common axis in their respective valve chambers, with a common coaxial cam-operated valve actuator controlled by movement of the cam which is disposed in a cam chamber intermediate the first and second valve chambers and in alignment therewith, with the second, third, fourth and fifth fluid flow ports flow through which is controlled by the sleeve valve members being disposed on the outer sides of the valve members, with the first and sixth fluid flow ports in coaxial alignment with the open centers of the sleeve valve cylinders. This conserves space, makes possible a more compact valve housing, and also facilitates insofar as possible pressure balancing the sleeve valve members, and cam-operated movement thereof with minimum effort between their limiting positions.

A duplex filter assembly, flow through the two filter assemblies of which is controlled by a preferred embodiment of the duplex sleeve valve of the invention, is shown in the drawings, in which.

Figure 1:
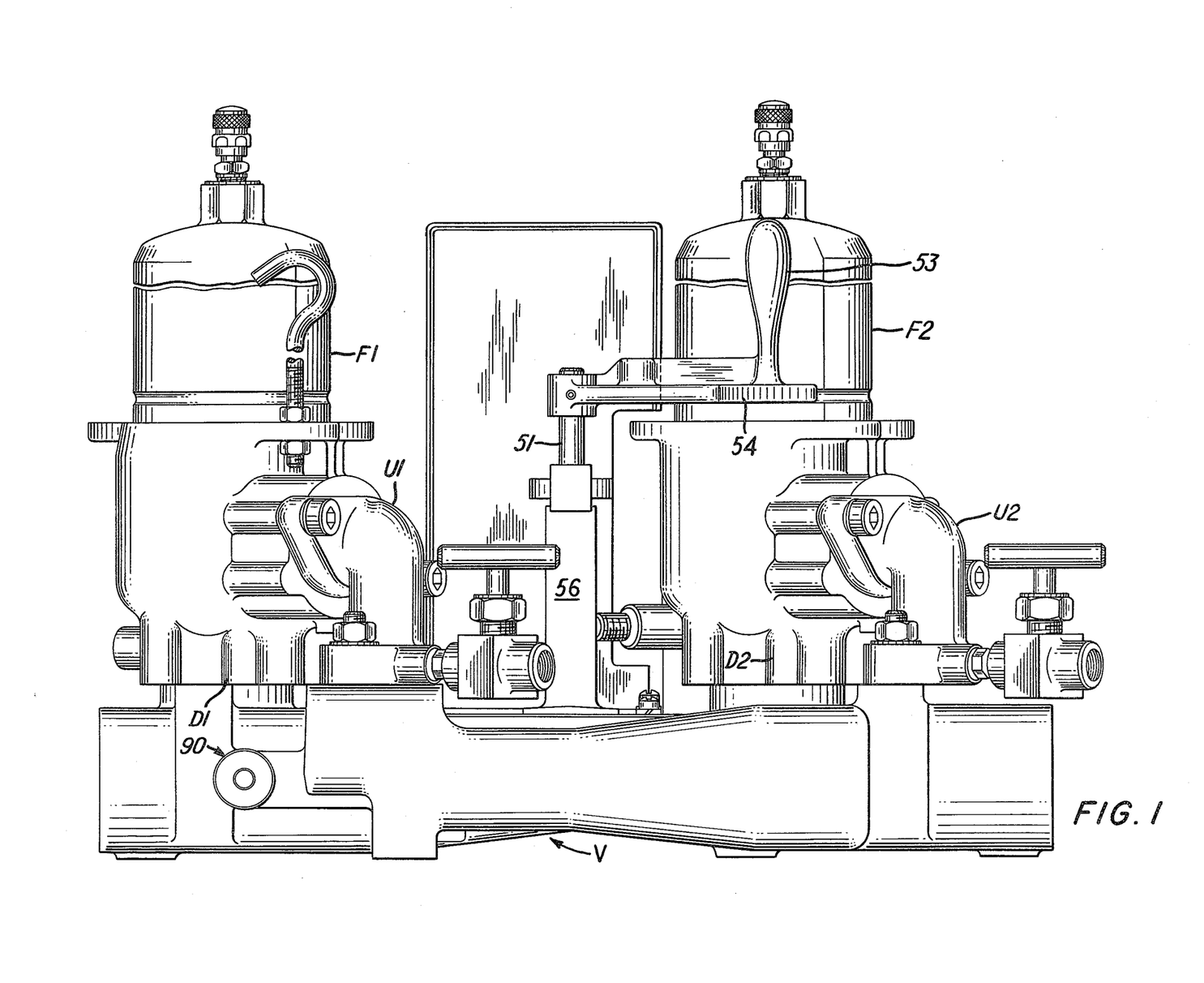
FIG. 1 represents a side view of the duplex filter assembly of the invention.
Figure 2:
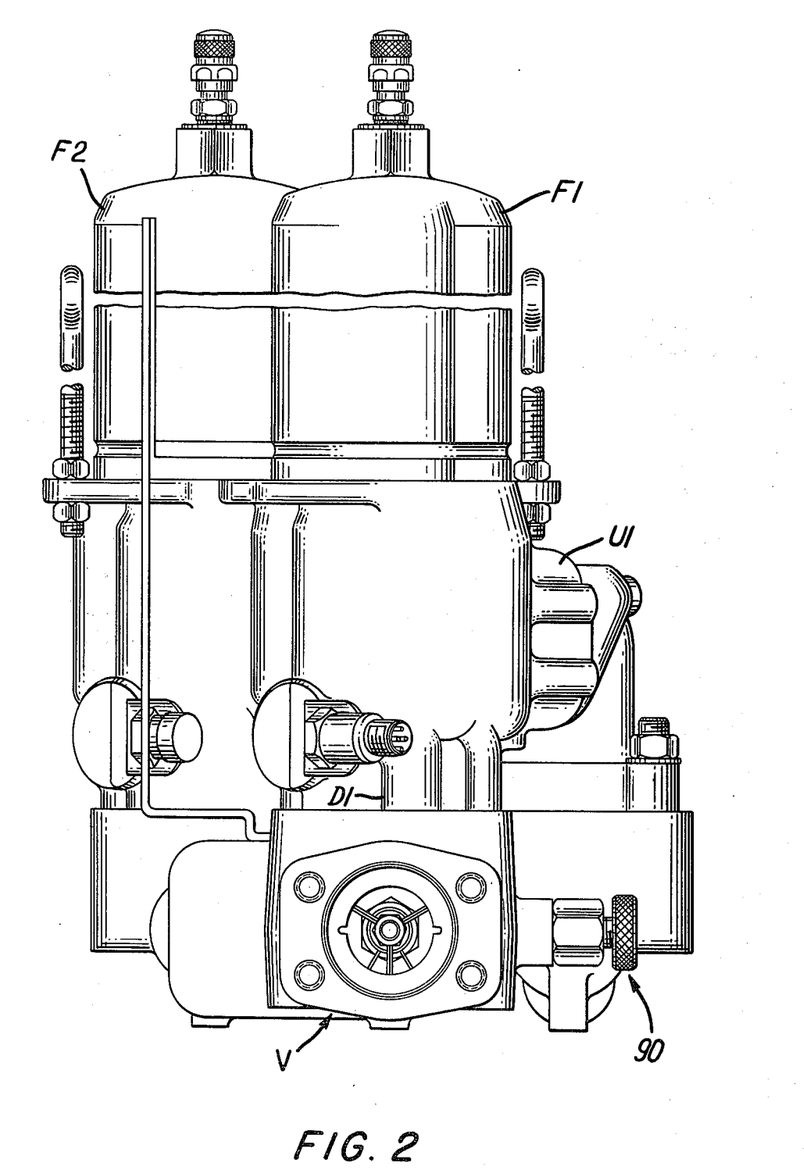
FIG. 2 represents an end view of the duplex filter assembly of FIG. 1.
Figure 3:
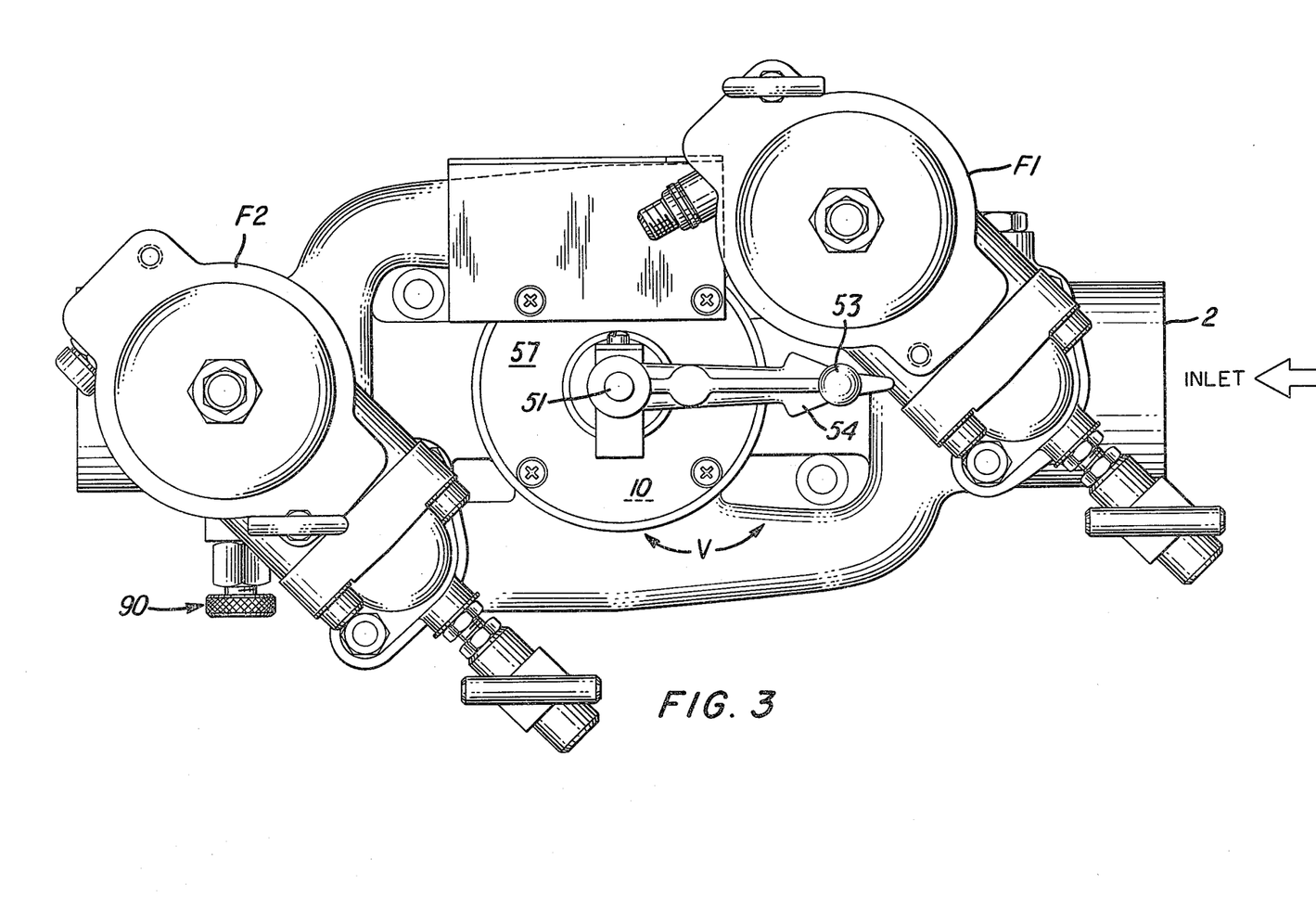
FIG. 3 represents a top view of the duplex filter assembly of FIG. 1.
Figure 12:
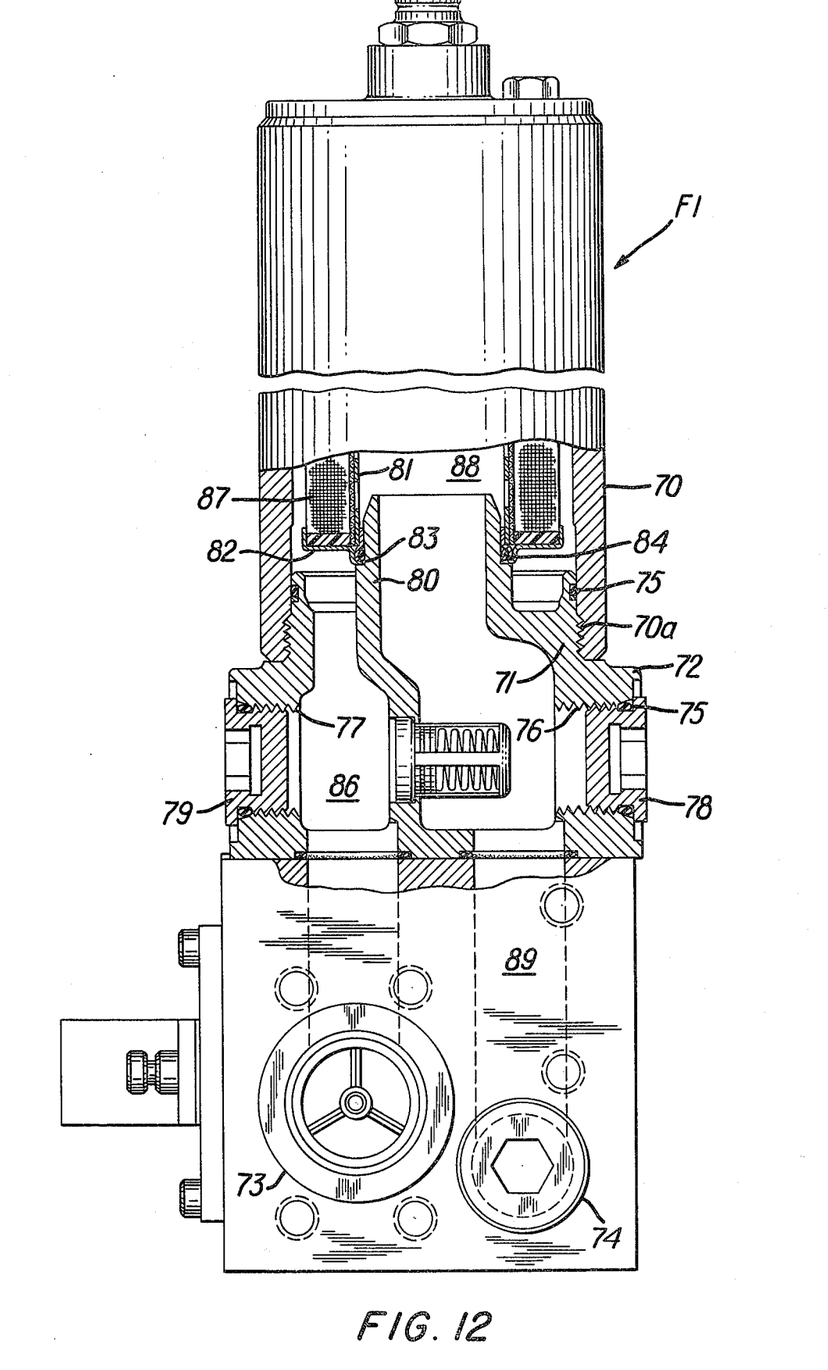
FIG. 12 represents a view, partly in section, with parts cut away, of one filter assembly shown in FIGS. 1 to 3.

The duplex filter assembly shown in FIGS. 1 to 3 is composed of two filter assemblies F1 and F2 of which one is shown in detail in FIG. 12 and a duplex sleeve valve V according to the invention and shown in detail in FIGS. 4 to 8, controlling the flow from the inlet I into the inlet valve chamber C1 and then via one or both of fluid flow passages U1, U2 to the upstream side of the filter assembly F1, F2, respectively. Filtered fluid flow from the downstream side of the filter assembly flows via either of lines D1, D2 into the outlet valve chamber C2, and is then delivered as filtered fluid through the outlet port O.

The duplex sleeve valve shown in detail in FIGS. 4 to 7 has a housing 1 with three fluid flow ports 2, 3, 4, in fluid flow connection with a first valve chamber 8, and three fluid ports 5, 6, 7 in fluid flow connection with a second valve chamber 9. A cam chamber 10 is intermediate and in axial alignment with chambers 8, 9.

Figure 4:
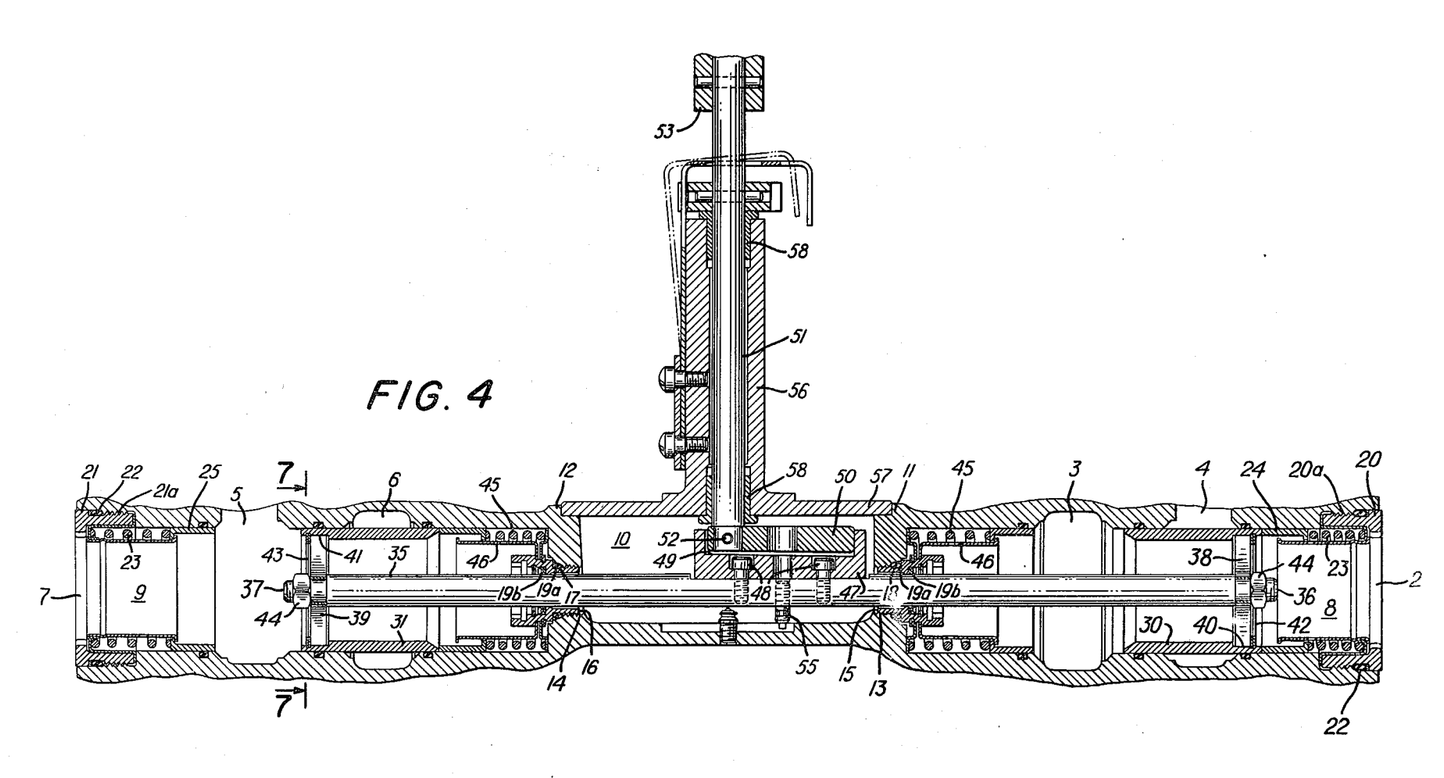
FIG. 4 represents a longitudinal section taken along the line 4—4 through the duplex sleeve valve assembly shown in FIGS. 1 to 3, showing the two cylindrical sleeve valve members and the cam and cam shaft in one limiting position.

The fluid ports 2, 7 are defined by seal bushings 20, 21, which are secured at one end of sleeve valve chambers 8, 9 in the expanded end bores 20a, 21a of the housing, a fluid tight seal with the housing being provided by O-rings 22. Attachment of inlet feed and outlet feed fluid lines, respectively, at the ports can be by any conventional means, such as port adaptors.

Each bushing 20, 21 is cylindrical, and has an inwardly extending flange serving as a seat for one end of a compression spring 23, the other end of which seats against one end of the cylindrical seal guards 24, 25. The other end of each seal guard engages one end of each sleeve valve 30, 31, resiliently retaining it in the outer of its limiting positions. Each valve member 30, 31 is biased towards the seal guards by compression springs 45, and reciprocates slidingly along the wall of its valve chamber 8, 9 with the valve transfer shaft 35. If desired, slipper seals can be provided for uniform low-frictional sliding movement of the valve members 30, 31 along the interior wall of valve chambers 8, 9, but these are not necessary.

Extending through each valve chambers 8, 9 of the housing is a reciprocable sleeve valve transfer shaft 35. At each end 36, 37 of the shaft 35 is mounted one of the sleeve valve members 30, 31, via spiders 38, 39. The spiders are held in sockets 40, 41 in the valve members via retaining rings 42, 43 and jam nut 44, threaded onto the shaft ends.

Extending across the inner end of each valve chamber 8, 9 is a separating wall 11, 12 integral with the remainder of the housing. A central cylindrical bore 13, 14 receives a plug bushing 15, 16, whose central bores in turn receive shaft 35. Each bushing is provided with circumferential recesses 17, 18 at each end, about both its external periphery and its internal periphery, and these are fitted with O-ring seals 19a and backup rings 19b, so as to provide a fluid-tight seal with the valve transfer shaft 35 and the walls of the valve chambers 8, 9. In addition, each bushing carries a spring frame 46 supporting the other end of springs 45 and guarding the sides of springs 45.

The central portion of shaft 35 within cam chamber 10 is fixed to the cam follower 47 by head screws 48. The cam follower in turn has an internal recess 49 receiving a cam 50, which is free to rotate in the recess and so control reciprocating movement of cam follower 47.

The cam 50 is fixedly attached to the cam shaft 51 by pin 52. Rotation of the camshaft thus rotates the cam and reciprocates the cam follower 47 and sleeve valve transfer shaft 35 between limiting positions defined by a predetermined throw of the cam, and accordingly moves the sleeve valve members 30, 31 between their limiting positions and at any selected intermediate position as well. The outer end of camshaft 51 carries a handle 53 for manual operation of the cam, as well as an indicator 54 moving over a locator diagram showing the position of the valve. The set screw 55 positions the shaft cam follower and cam in the cam chamber 10.

The cam mechanism is housed within the cam chamber 10, with the camshaft 51 carried within hub 56, cam cover 57, removably or permanently anchored to the housing 1 by any desired means. The cam chamber 10 is open to the atmosphere, and bushings 58 at each end of the hub provide for free rotation of the camshaft with rotation of the handle 53.

Opening into the sleeve valve chamber 8 at the side of sleeve valve 30 are fluid port 3 and fluid port 4. In sleeve valve chamber 9 there are corresponding fluid port 5 and fluid port 6 at the side of sleeve valve 31.

Figure 5:
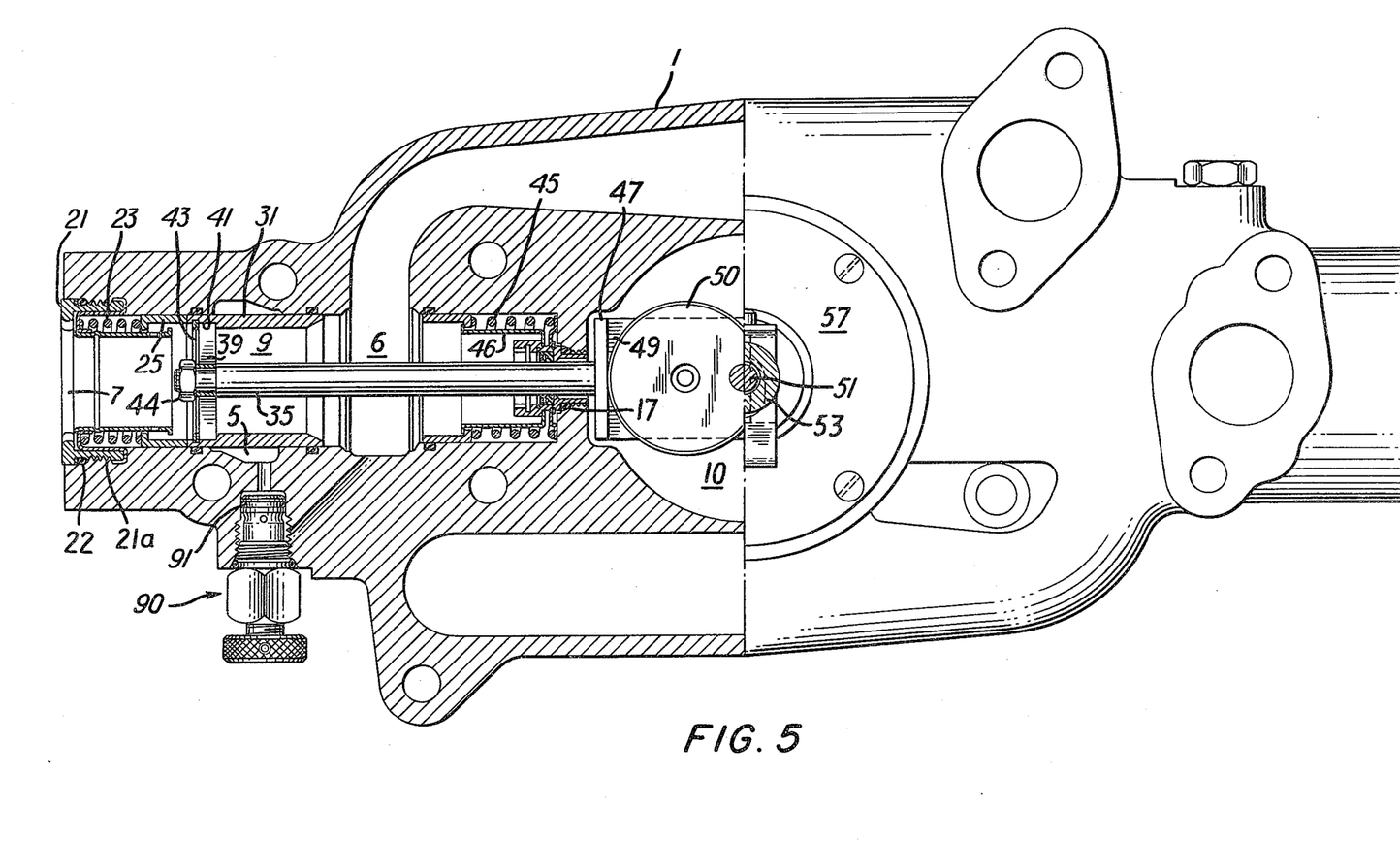
FIG. 5 represents a longitudinal section taken along the line 5—5 of FIG. 4, showing a top view of the duplex filter assembly of FIG. 1 and the commuter valve.
Figure 6:
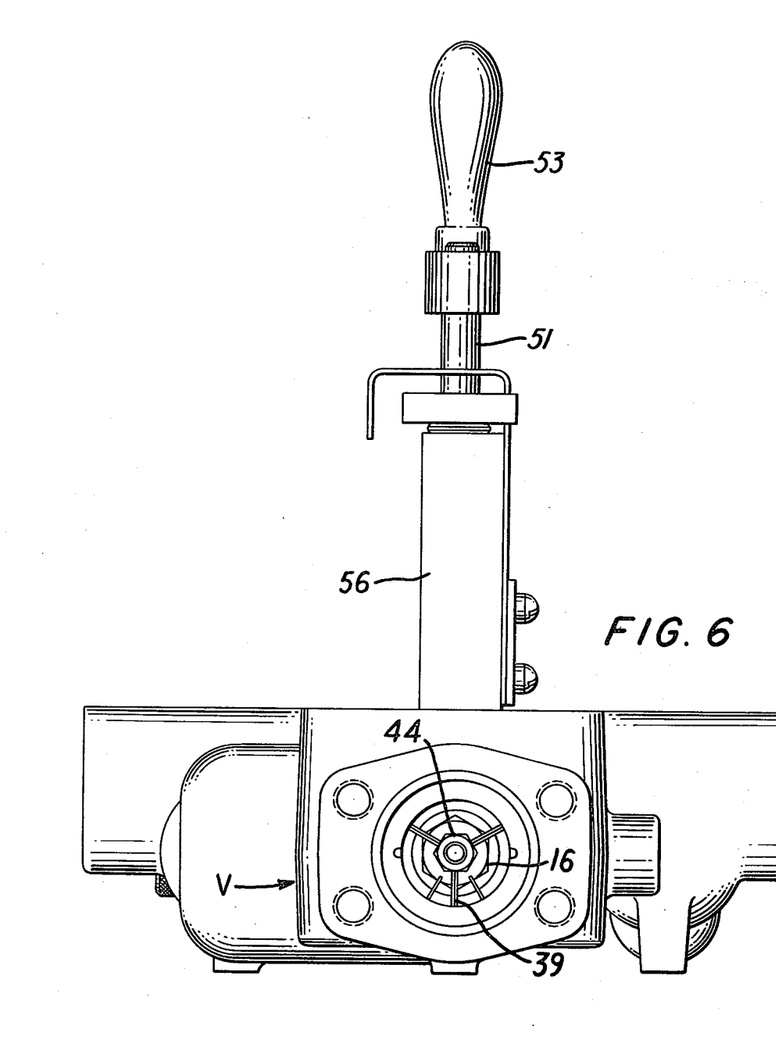
FIG. 6 represents an end view, taken along the line 6—6 of FIG. 4, of the duplex sleeve valve.
Figure 7:
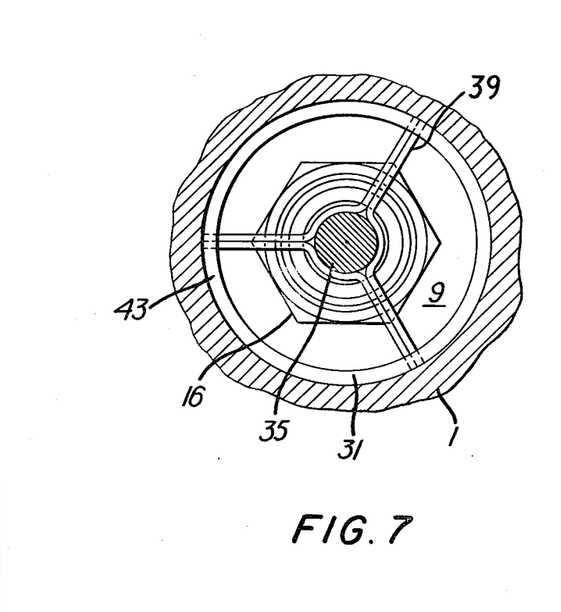
FIG. 7 represents a cross-section of the duplex sleeve valve taken along the line 7—7 of FIG. 4.

It may be noted in FIGS. 4 and 5 that ports 3,4,5,6 are easily formed by direct bores into the housing 1.

With the sleeve valves 30,31 positioned as shown in FIG. 4, it will be seen that the sleeve valve 30 exposes the fluid port 3, and thus permits fluid flow between the port 2 and the port 3, while it extends over and closes off fluid port 4.

Similarly, the sleeve valve 31 in the position of the valve shown in FIG. 4 exposes fluid port 5, and thus permits fluid flow between the port 5 and the port 7, while it extends over the fluid port 6 and consequently closes off this fluid port.

Figure 9:
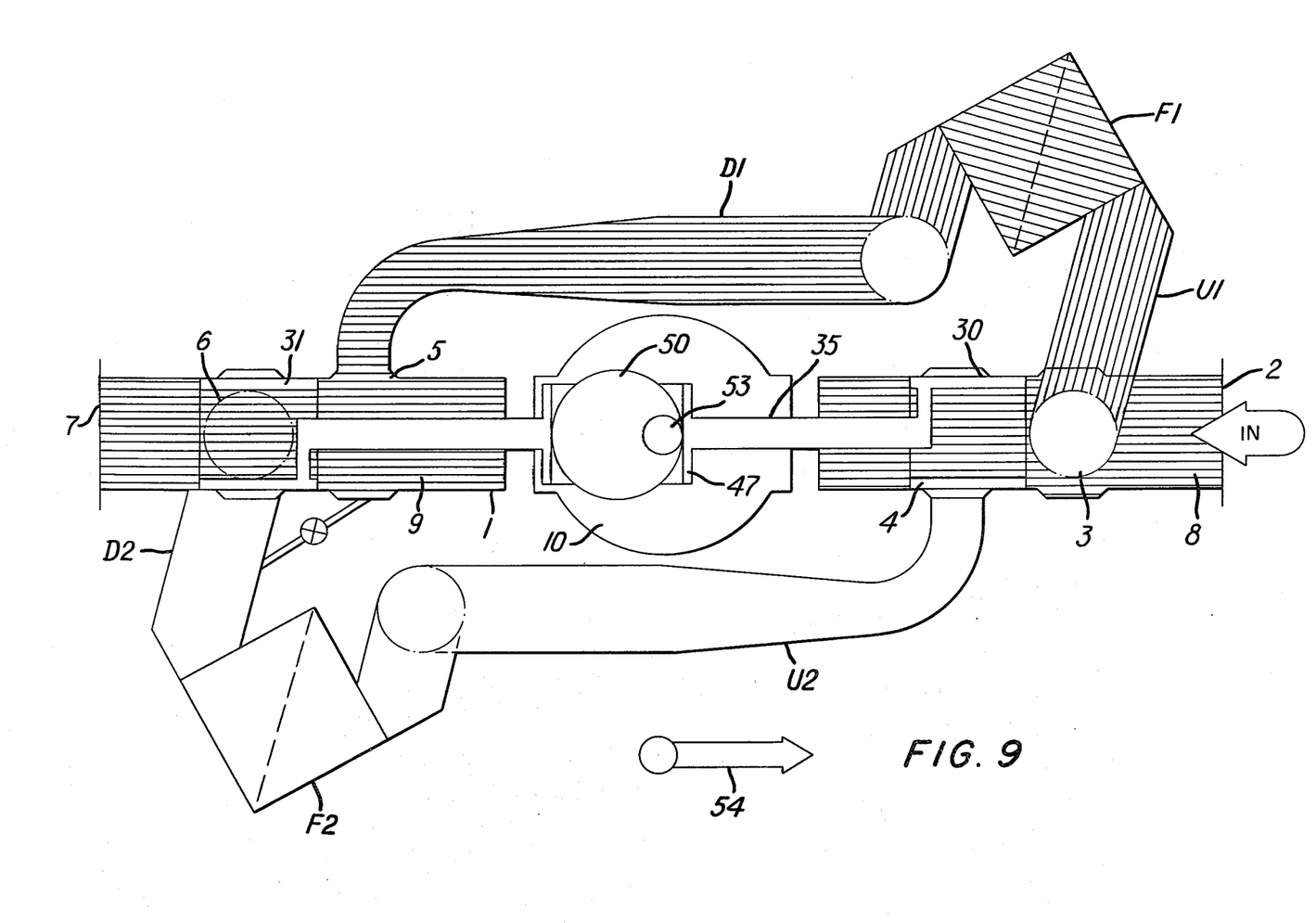
FIG. 9 represents a flow schematic diagram showing the flow path of fluid through the duplex filter assembly of FIGS. 1 to 3 with the duplex sleeve valve in the position shown in FIG. 4.

Accordingly, with the sleeve valves 30,31 in this position as seen in the flow schematic of FIG. 9, fluid entering the port 2 and valve chamber 8 is directed by the sleeve valve 30 out the fluid port 3. As shown in FIGS. 1 to 3, with a filter assembly F1 attached across the ports 3,5 of the housing 1, unfiltered fluid flow from the port 3 passes via upstream line U1 through the filter assembly F1, and then, after passing through the filter, can pass via downstream line D1 to reenter the valve housing at fluid port 5. Such filtered fluid flow after port 5 passes into the valve chamber 9, and then through the open center of the sleeve valve 31, to exit from the valve housing at the port 7.

Filter assembly F2 is offstream, ports 4, 6 and lines U2, D2 being closed by sleeve valves 30,31.

Figure 8:
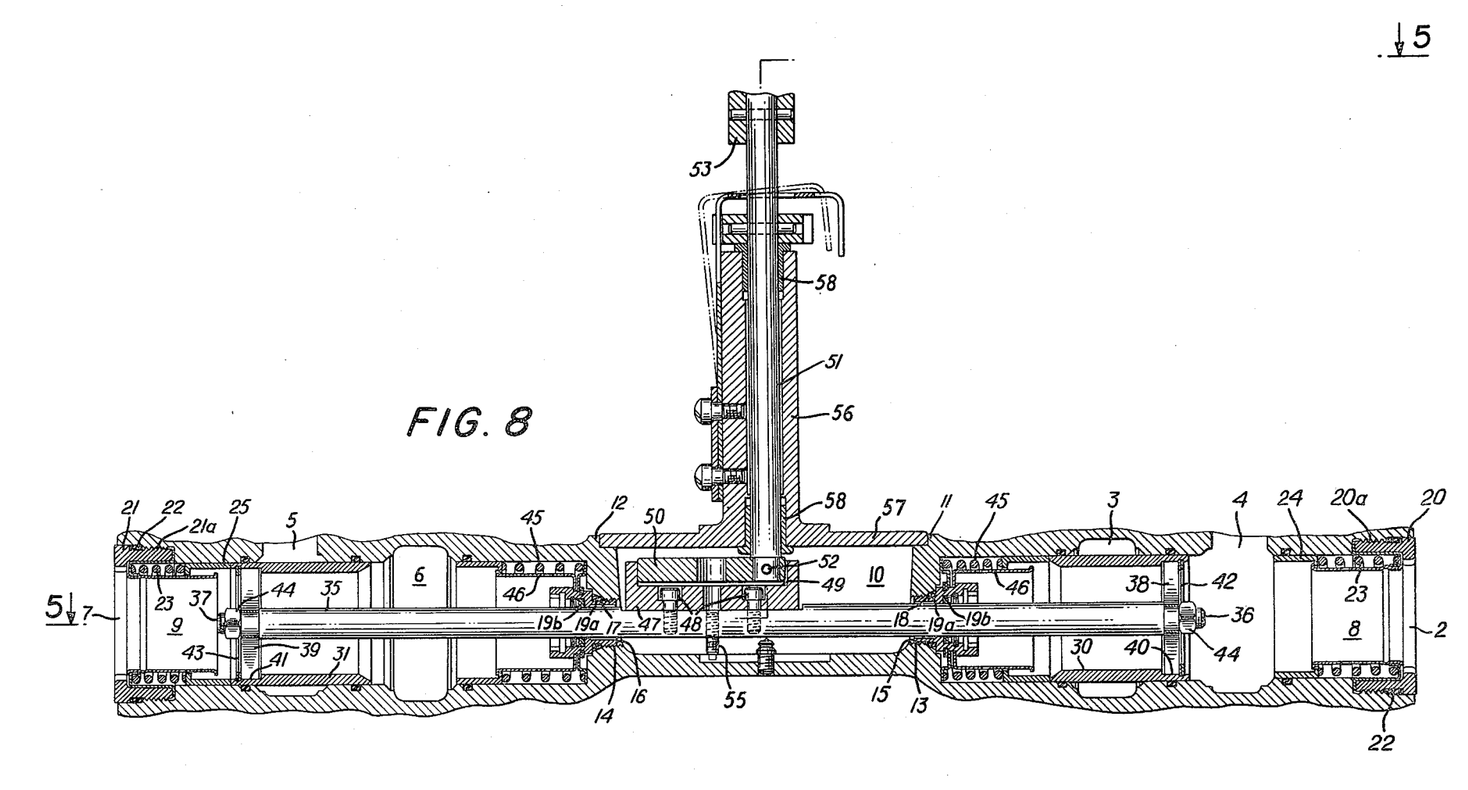
FIG. 8 represents a further longitudinal section as in FIG. 4 showing the sleeve valve members and the cam in the other limiting position.
Figure 10:
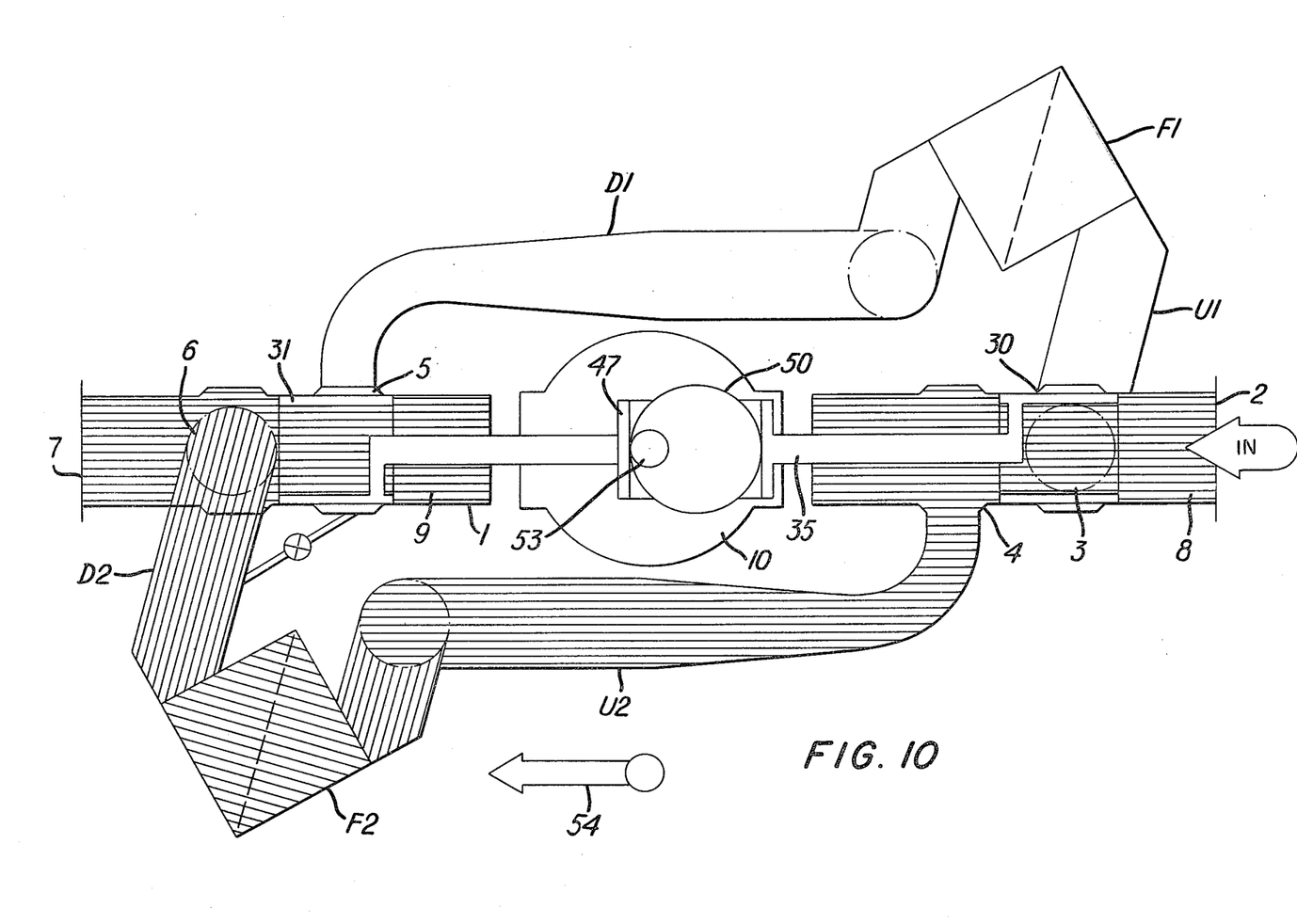
FIG. 10 represents a flow schematic diagram showing the flow path of fluid through the duplex filter assembly of FIGS. 1 to 3 with the duplex sleeve valve in the position shown in FIG. 8.

If now the valve be shifted in position to the right, to the position shown in FIG. 8, the other limiting position of sleeve valves 30,31, the flow is as shown in flow schematic diagram FIG. 10. Now, the sleeve valve 30 closes off the fluid port 3, and opens the fluid port 4 to fluid flow, while the sleeve valve 31 now closes off the fluid port 5 but exposes the fluid port 6 to flow. Thus, fluid flow from the inlet port 2 into chamber 8 2ill now be directed into and through port 4 via line U2 to the second filter assembly F2. Unfiltered fluid flow will proceed to the upstream side of the filter, will then pass through the filter, and then, via line D2, reenter the valve housing 1 via the port 6, and through chamber 9, then exiting from the valve housing via the outlet port 7.

One filter assembly unit F1 of the two-unit filter assembly is shown in more detail in FIG. 12. It will of course be appreciated that the filter assembly F2 is identical.

The filter assembly F1 shown in FIG. 12 includes a filter bowl 70 threadably attached at 70a to a projecting portion 71 of a filter housing 72. The filter housing is provided with ports 73 and 74 in fluid flow connection via lines U1, D1 with the fluid flow ports 3 and 5, respectively, of the valve housing 1. A fluid-tight seal at all port connections is provided by the O-rings 75. The filter housing includes two additional ports 76,77 which are closed off by plugs 78,79.

Attached to a central projecting portion 80 of the filter housing is a cylindrical filter element 81. One end cap 82 of the filter element has a central aperture 83 which embraces portion 80 of the housing in a fluid-tight seal insured by the O-ring seal 84. The other end cap (not shown) of the filter element is closed off. Accordingly, all fluid flow entering the filter housing 72 and the bowl 70 via the inlet passage 86 must pass into the bowl to the outside of the filter element, then through the filter sheet 87 into the inside central passage 88 of the filter element 81, whence it can escape by way of the outlet passage 89 of the filter housing, connecting with the valve housing 1 via the port 73, line D1, and port 5.

The filter element 81, when loaded with contaminants to the extent that fluid flow therethrough is seriously impaired, can be changed after shifting the valve elements 30,31 to their other position, seen in FIGS. 8 and 10, closing off the fluid flow, and putting the other filter assembly F2 onstream. When the ports are closed, flow through ports 3, 5 stops, and upon venting and draining of the housing, the filter bowl can be unscrewed, giving access to the filter element 81, which can then be pulled off the end of the housing 72, and replaced. The filter bowl can then be reattached to the housing, and after being filled, vented and repressurized through the commuter valve this filter assembly then is held in reserve, ready to be put on-stream when the other filter element F2 has been loaded, and is ready for replacement, simply by shifting the valve elements 30,31 back to their original positions, shown in FIGS. 4 and 9.

Figure 11:
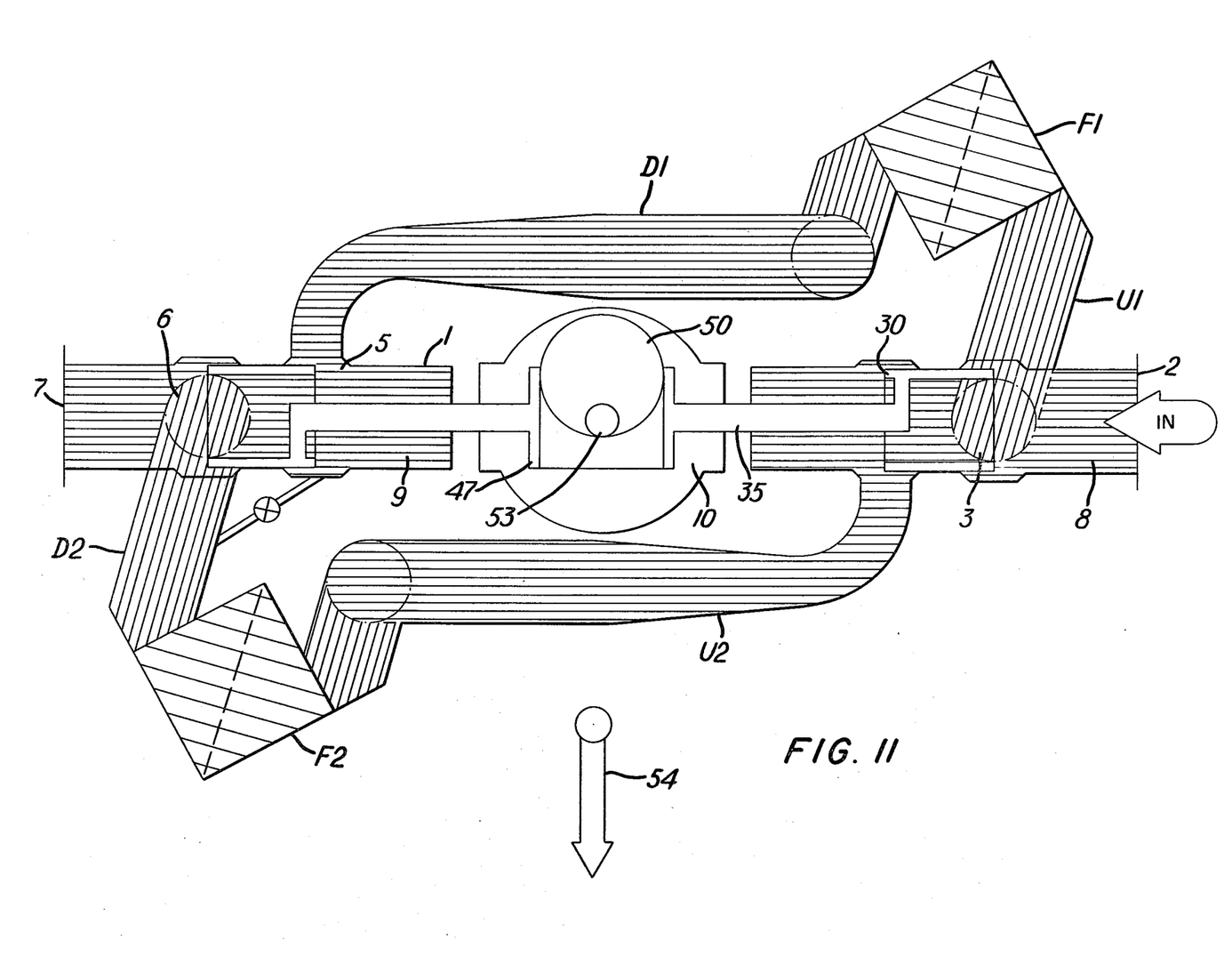
FIG. 11 represents a flow schematic diagram showing the flow path of fluid through the duplex filter assembly of FIGS. 1 to 3 with the duplex sleeve valve in a position intermediate that shown in FIGS. 4 and 8.

It is also possible to put both filter assemblies F1, F2 onstream together, with equally apportioned flow to each, controlled by the valve. It is only necessary to put the valve in its intermediate position as shown in FIG. 11. With the sleeve valves 30,31 in the position shown in FIG. 11, both elements partially close off ports 3,4,5,6 limiting flow in each to one-half normal flow at the inlet port 2. Flow entering the valve at the inlet port 2 can now proceed via the port 3 into filter assembly F1, emerging from the filter assembly and entering the valve housing again via port 5, and also via port 4 to filter assembly F2, reentering the housing at port 6. The two filtered flows through the filter assemblies are extended in chamber 9, and full filter flow exits via port 7.

A further feature of the sleeve valve of the invention is a commuter valve 90, best seen in FIG. 5. This valve is fixed in bore 91 of the housing, and controls flow via the bore 91 into chamber 9 at a point adjacent to the ports 5, 6 on the downstream side of the filter assemblies F1,F2 and upstream of the sleeve valve 31. By appropriate fluid flow connections to the valve 90, filtered fluid or gas can be fed into lines D1,D2 to repressurize the downstream side of the filter assemblies F1,F2 or whatever function is installed in their place, such as a sorbent bed, before putting a fresh filter or regenerated sorbent bed onstream, preventing contamination and damage due to differential pressure across the filter or sorbent bed.

The cam-operated duplex sleeve valves of the invention are particularly adapted for use in fluid systems to control flow through twin filter assemblies or other functions that require servicing or replacement from time to time, permitting continued flow through one function while putting the other function off stream.

The cam-operated duplex sleeve valves of the invention can be made of any suitable materials, such as plastic or metal. Stainless steel is a particularly durable material of construction, suitable for most uses, especially in valves for use with filter elements, where resistance to attack by fluids is required, and is preferred both for the sleeve valve elements and for the valve housing and other components of the valve that come into contact with the fluid. It is, however, also suitable to make the valves of plastic, such as polytetrafluoroethylene, nylon, polycarbonate, phenol-formaldehyde, urea-formaldehyde, or melamine-formaldehyde resins. It is also suitable to fabricate the valve housing and valve elements of stainless steel, and interpose a durable plastic sleeve as the insert in the valve chamber serving as a track, such as, for example, polytetrafluoroethylene or nylon.

Matched sleeve valves moving in honed or roller-burnished bores or cylinders can be provided where fluid incompatibility with dynamic seals would preclude their use.

Having regard to the foregoing disclosure, the following is claimed as patentable and inventive embodiments thereof:

1. A duplex cam-operated pressure-balanced sleeve valve for controlling fluid flow from one fluid line into either one or both of two fluid lines, comprising, in combination;

(1) a valve housing;
(2) first and second valve chambers in the housing in alignment with a cam chamber therebetween;
(3) first, second, and third fluid flow ports in the housing communicating with the first valve chamber, and fourth, fifth, and sixth fluid flow ports in the housing communicating with the second valve chamber;
(4) a first reciprocable sleeve valve member in the first valve chamber, axially movable within the first valve chamber between positions controlling flow from the first fluid port to one or both of the second and third fluid flow ports;
(5) a second reciprocable sleeve valve member, preferably coaxial with the first sleeve valve member, in the second valve chamber axially movable within the second valve chamber with the first sleeve valve member between positions controlling flow from one or both of the fourth and fifth fluid flow ports to the sixth fluid flow port;
(6) cam-following vlave-actuating means in the cam chamber operatively connected to both the first and second sleeve valve members, for reciprocably moving both valve members together between their flow-controlling positions;
(7) a cam in the cam chamber movable between at least three selected positions and operatively connected with the cam-following valve-actuating means in a manner such that:
(a) with the cam in a first position, the first sleeve valve member is in a position communicating one of the second and third fluid flow ports with the first fluid flow port, and the second sleeve valve member is in a position communicating one of the fourth and fifth fluid flow ports with the sixth fluid flow port;
(b) with the cam in a second position, the first sleeve valve member is in a position communicating the other of the second and third fluid flow ports with the first fluid flow port, and the second sleeve valve member is in a position communicating the other of the fourth and fifth fluid flow ports with the sixth fluid flow port;

(c) with the cam in a third position, both the first and second sleeve valve members are in positions communicating the first with the second and third fluid flow ports and the fourth with the fifth and sixth fluid flow ports;

(8) means for moving the cam between each of the selected positions, thereby shifting the valves in unison;

(9) the first and second sleeve valve members each having an interior pressure-receiving surface exposed at all times to fluid pressure in the first and second valve chambers, respectively, and in the first and sixth fluid flow ports, respectively, and an exterior pressure-receiving surface exposed to fluid pressure in the second and third, and fourth and fifth, fluid flow ports, respectively, fluid flow through which is controlled by the respective sleeve valves, so that there is a zero component of force arising from any pressure differential across the valves tending either to move the sleeve valve members or to resist cam-operated movement of the sleeve valve members between their selected positions;

(10) the cam-following valve actuating means having opposed pressure-receiving surfaces, of which one is exposed to fluid pressure in the first valve chamber, and the other is exposed to fluid pressure in the second valve chamber;

(11) the opposed pressure-receiving surfaces of the cam-following valve-actuating means being of such small relative surface areas that any fluid pressure differential between first and second valve chambers on the opposed pressure-receiving surfaces thereof offers negligible resistance to cam-operated reciprocation of the sleeve valve members, so that such fluid pressure differential does not interfere with movement of the first and second sleeve valve members between their selected positions.

2. A duplex sleeve valve according to claim 1, in which the first and second sleeve valve members are fixed to and movable with first and second reciprocable transfer shafts, respectively, each of which is attached to the cam-following valve-actuating means and moves therewith along their respective valve chambers.

3. A duplex sleeve valve according to claim 2 in which the cam-following valve-actuating means defines an internal track along which the cam travels in moving between its selected positions.

4. A duplex sleeve valve according to claim 2 in which the housing defines internal walls separating the first and second valve chambers from the cam chambers, and having a central passage therethrough, and the transfer shafts extend through and are reciprocably movable within the passage.

5. A duplex sleeve valve according to claim 1 in which each of the tubular sleeve valve members is cylindrical.

6. A duplex sleeve valve according to claim 1 in which the valve members are concentric with their respective valve chambers and coaxial with each other, the first and sixth fluid flow ports, and the cam chamber and cam-following valve-actuating means.

7. A duplex sleeve valve according to claim 1 in which the valve chambers adjacent the first and sixth fluid ports each carry coaxial tubular seal guards biased towards and reciprocably movable with the sleeve valve members.

8. A duplex sleeve valve according to claim 7 in which the valve chamber, sleeve valve members and seal guards are all cylindrical.

9. A duplex filter assembly comprising two filter assemblies arranged in parallel with each in series valve-controlled fluid flow connection with a fluid line in a manner such that either one filter assembly at a time or both filter assemblies together receives fluid flow from and returns fluid flow to the line, and a duplex sleeve valve according to claim 1 controlling flow to and from the fluid line and each filter assembly.

10. A duplex filter assembly according to claim 9, in which the filter assemblies each comprise:

(a) a housing having a fluid inlet and fluid outlet, a filter chamber, and fluid flow passages interconnecting the inlet and outlet and the filter chamber; and (b) a filter element disposed in the filter chamber across the line of flow between the inlet and the outlet in a manner such that all flow between the inlet and the outlet must pass through the filter.

11. A duplex filter assembly according to claim 10 in which the filter chamber is defined by a filter cannister removably attached to the housing, and the filter elements are cylindrical, with end caps at each end.

* * * * *

UNITED STATES PATENT AND TRADEMARK OFFICE
CERTIFICATE OF CORRECTION

PATENT NO. : 4,410,428
DATED : October 18, 1983
INVENTOR(S) : Roydon B. Cooper

It is certified that error appears in the above-identified patent and that said Letters Patent are hereby corrected as shown below:

Column 2, line 8 : "Copper" should be --Cooper--
Column 2, line 16 : after "fluid" insert --flow--
Column 2, line 63 : "interconnecting" should be --intercommunicating--
Column 8, line 53 : "2ill" should be -- will --.
Column 9, line 17 : "73" should be --74--
Column 10, line 50 : "vlave" should be --valve--

Signed and Sealed this

Twelfth Day of November 1985

[SEAL]

Attest:

DONALD J. QUIGG

Attesting Officer

Commissioner of Patents and Trademarks